United States Patent
Karpov et al.

(10) Patent No.: US 9,450,374 B2
(45) Date of Patent: Sep. 20, 2016

(54) PUMP LASER ARCHITECTURE AND REMOTELY PUMPED RAMAN FIBER AMPLIFIER LASER GUIDE STAR SYSTEM FOR TELESCOPES

(71) Applicant: MPB COMMUNICATIONS INC., Montreal (CA)

(72) Inventors: Vladimir Karpov, Pointe Claire (CA); Daoping Wei, Saint Laurent (CA); Wallace R. L. Clements, Pointe Claire (CA)

(73) Assignee: MPB COMMUNICATIONS INC., Montreal, QC (CA)

( * ) Notice: Subject to any disclaimer, the term of this patent is extended or adjusted under 35 U.S.C. 154(b) by 0 days.

(21) Appl. No.: 14/849,159

(22) Filed: Sep. 9, 2015

(65) Prior Publication Data
US 2016/0006209 A1     Jan. 7, 2016

Related U.S. Application Data

(63) Continuation of application No. PCT/CA2014/050858, filed on Sep. 10, 2014.

(60) Provisional application No. 61/876,893, filed on Sep. 12, 2013.

(51) Int. Cl.
*H01S 3/30*    (2006.01)
*H01S 3/067*   (2006.01)
(Continued)

(52) U.S. Cl.
CPC ............. *H01S 3/302* (2013.01); *H01S 3/0092* (2013.01); *H01S 3/067* (2013.01); *H01S 3/06712* (2013.01); *H01S 3/06754* (2013.01);
(Continued)

(58) Field of Classification Search
CPC .. H01S 3/302; H01S 3/094046; H01S 3/067; H01S 3/06754; H01S 3/094053; H01S 3/06712; H01S 3/0092; H01S 3/1618; H01S 3/094096; H04J 14/02
See application file for complete search history.

(56) References Cited

U.S. PATENT DOCUMENTS 6,625,347 B1    9/2003  Wu
8,472,486 B1 *  6/2013  Henry ................. H01S 3/06754
                                                       372/3

(Continued)

OTHER PUBLICATIONS

Calia et al., PM fiber lasers at 589nm: a 20W transportable laser system for LGS return flux studies, Proc SPIE 7736, Adaptive Optics System II, 77361U, Jul. 27, 2010.

(Continued)

*Primary Examiner* — Yuanda Zhang
(74) *Attorney, Agent, or Firm* — Anglehart et al.

(57) ABSTRACT

There is provided a system for remote pumping of a Raman fiber amplifier comprising a pump laser located remotely from the Raman fiber amplifier and a laserhead and one or more optical fibers to optically couple the high power pump light from the remote pump laser to the Raman fiber amplifier where a seed laser light is amplified wherein the pump laser for producing a high power laser light of a predetermined pump wavelength comprises a first fiber laser emitting light at the predetermined pump wavelength and one (second) or two (third) laser emitting light at a wavelength lower than the predetermined pump wavelength and multiplexed with light from the first laser into an optical fiber providing Raman gain at the predetermined pump wavelength to convert the second (and optionally also the third) laser light to light at the predetermined pump wavelength.

14 Claims, 9 Drawing Sheets

(51) Int. Cl.
  *H01S 3/094* (2006.01)
  *H01S 3/00* (2006.01)
  *H01S 3/16* (2006.01)
(52) U.S. Cl.
  CPC ... *H01S3/094046* (2013.01); *H01S 3/094053* (2013.01); *H01S 3/094096* (2013.01); *H01S 3/1618* (2013.01)

(56) References Cited

U.S. PATENT DOCUMENTS

2003/0133180 A1* 7/2003 Yang ............... H01S 3/094003
                                                    359/341.3
2009/0128891 A1   5/2009  Fella
2011/0274125 A1  11/2011  Kitabayashi
2014/0254614 A1*  9/2014  Nicholson ........... H01S 3/06754
                                                    372/3

OTHER PUBLICATIONS

Georgiev et al. Watts-level frequency doubling of a narrow line linearly polarized Raman fiber laser to 589 nm, Optics Express, vol. 13 No. 18, p. 6772-6776, Sep. 5, 2005.
PCT/CA2014/050858 international search report.
PCT/CA2014/050858 search details.
PCT/CA2014/050858 written opinion.

* cited by examiner

PUMP LASER ARCHITECTURE AND REMOTELY PUMPED RAMAN FIBER AMPLIFIER LASER GUIDE STAR SYSTEM FOR TELESCOPES

TECHNICAL FIELD

This invention relates to laser pumps, and more specifically, to apparatuses and methods for remote pumping of Raman fiber amplifiers, such as those used in guide star lasers for telescopes.

BACKGROUND

Modern astronomy and high altitude imaging in general make use of telescopes with large or very large mirrors to enhance optical resolution and light collection efficiency. The high resolution provided by these telescopes is limited by the distortion in the wavefront of the light arriving from celestial objects caused by atmospheric turbulence.

In order to compensate for this distortion, adaptive optics can be employed to correct the wavefront. Such adaptive optics require that a "reading" of the atmosphere be performed in order to characterize the distortion and adjust the optics of the telescope accordingly. One approach has been to use a laser (so called guide star laser) at a wavelength of 589 nm to excite sodium atoms in the atmosphere which induces fluorescence emission. The fluorescence emission from this artificial "star" is then captured and imaged by the telescope. A portion of the imaged light is directed to a wavefront analyzer which analyzes the wavefront and provides the necessary information to update the deformation of the telescope's adaptive optics mirror to eliminate any developing wavefront distortion.

This approach requires high power lasers to enable the light beam to reach altitudes in the 100-km range and to excite a large enough number of the sodium atoms present in an atmospheric layer with a thickness of several km to produce sufficient fluorescence emission. Efficient excitation of the sodium atoms to produce a useful fluorescence emission depends critically on a narrow excitation linewidth and the polarization state of the exciting light. Until very recently, high-power 589-nm guide star laser designs were expensive, bulky, difficult to use and maintain and so delicate and sensitive that they needed to be placed in a clean-room environment far from the launch telescope, necessitating a long and lossy beam relay optics path from the laser to the launch telescope. The breakthrough demonstration of high-power narrow-band Raman amplifiers by researchers at the European Southern Observatory [see for instance, L. Taylor et al., Optics Express 17(17), 14687-14693 (2009) and Y. Feng et al., Optics Express 17(21), 19021-19026 (2009)] proved the feasibility of guide star lasers based on frequency doubling the 1178-nm output of a narrow-band Raman fiber amplifier (RFA). The compact and robust all-fiber nature of such a system means that the laserhead, which includes the RFA and frequency-doubling optics, can be mounted right on the telescope centerpiece structure [see for instance, W. G. Kaenders et al., Proc. SPIE 7736, 232 (2010)] with the remainder of the guide star system (the fiber laser to pump the RFA, the 1178-nm seed laser, wavelength meter, control electronics and the power supplies) housed in an electronics cabinet.

While there are advantages to this frequency-doubled narrow-band 1178-nm RFA system concept, there are challenges to be overcome with regard to the requirements of many telescopes relating to the physical locations of the laserhead and the electronics cabinet.

SUMMARY

In some cases, the pump source can be mounted on the telescope centerpiece close to the laserhead; however, frequently it is desirable to avoid having the electronics cabinet too close to the telescope since the heat produced by the modules in the electronics cabinet may induce local air turbulence and thermal perturbations of the telescope optics which would degrade the telescope's imaging quality. In addition, the electronics cabinet is a relatively large unit which can make it difficult to mount it in the tight confines close to the launch telescope. This then raises the problem of delivering the high-power pump light from the fiber laser pump module (in the electronics cabinet) over an extended distance to the RFA (located in the laserhead). Delivery of the pump light via an optical fiber is preferable to a free-space optical relay scheme involving multiple mirrors. The main challenge when delivering high power over an optical fiber several tens of meters in length is preventing the Raman conversion of the light being delivered to light at its first Stokes wavelength.

L. Taylor et al. [Optics Express 17(17), 14687-14693 (2009)], Y. Feng et al. [Optics Express 17(21), 19021-19026 (2009)] and Y. Feng et al. [Optics Express 17(26), 23678-23683 (2009)] disclose high power Raman fiber lasers emitting at a wavelength of 1120 nm. However, these laser designs suffer from a number of disadvantages for serving as a high-power (e.g. 100-W class) remote pump laser. First, to generate 100 W at the RFA pump wavelength of 1120 nm, the Raman fiber laser in these designs would have to be pumped by a fiber laser with an output power of ~130 W at 1070 nm, which presents challenges regarding heat dissipation from the active fiber in the pump laser. Secondly, although the Raman fiber laser resonator is several tens of meters long and one could consider using it as the delivery fiber for remote RFA pumping, the pump delivery fiber would be a fiber laser resonator and thus the pump power delivered at 1120 nm would be very sensitive to fiber loss perturbations arising from the changing positions of the fiber as the telescope scans in azimuth and elevation. Thirdly, the Raman fiber laser resonator generates mode-beating intensity peaks and, since Raman fiber resonators are necessarily long (due to the low Raman gain), the peaks in the noise spectrum of the 1120-nm power extend all the way down to frequencies of ~3 MHz. As a result, the RFA would be pumped by a "noisy" pump, leading to a lowering of the Stimulated Brillouin Scattering (SBS) threshold and a lowering of the maximum achievable RFA output power. Lastly, these laser designs make it difficult to operate in a polarization-maintaining mode with a polarized 1070-nm fiber laser and a PM fiber Raman fiber laser since if even a small amount of polarization cross talk exists in the Raman laser cavity, any temperature fluctuations or movement of the resonator fiber would result in relatively large fluctuations in the 1120-nm output of the Raman fiber laser.

There is therefore a need to improve the design of such a laser guide star system to enable the efficient and stable delivery of the required RFA pump power from a fiber laser pump module located tens of meters away from the RFA.

The invention relates to a combination of a pump laser system and a remotely located optical amplifier, for example a Raman fiber amplifier. In exemplary embodiments, the combination can comprise one or more optical fibers to optically couple the high power pump light from the remote pump laser to the Raman fiber amplifier which amplifies a seed laser light.

In one embodiment there is provided a pump laser for producing a high power laser light of a predetermined pump wavelength comprising a first fiber laser emitting light at the predetermined pump wavelength, a second fiber laser emitting light at a wavelength lower than the predetermined pump wavelength, an optical arrangement configured to multiplex light from the first laser and the second laser into an optical fiber and a length of optical fiber providing Raman gain at the predetermined pump wavelength to convert the second laser light to light at the predetermined pump wavelength.

In another embodiment there is provided a pump laser for producing a high power laser light of a predetermined pump wavelength comprising a first fiber laser emitting light at the predetermined pump wavelength, a second fiber laser emitting light at a wavelength lower than the predetermined pump wavelength, a third fiber laser emitting light at a wavelength lower than the emission wavelength of the second fiber laser, an optical arrangement configured to multiplex light from the first, the second and the third laser into an optical fiber and a length of optical fiber providing Raman gain to successively convert the third laser light to light at the second laser wavelength and light at the second laser wavelength to light at the predetermined pump wavelength.

In yet a further embodiment there is provided a pump laser for producing a high power laser light of a predetermined pump wavelength comprising first and second linearly-polarized fiber lasers emitting light at the predetermined pump wavelength, means to polarization multiplex the light from the first and second fiber lasers into a first optical fiber, third and fourth linearly-polarized fiber lasers emitting light at a wavelength lower than the predetermined pump wavelength, means to polarization multiplex the light from the third and fourth fiber lasers into a second optical fiber, an optical arrangement configured to multiplex light at the predetermined pump wavelength from the first optical fiber and light from the second optical fiber into a single optical fiber and a length of optical fiber providing Raman gain to convert the multiplexed light from the third and fourth fiber lasers to light at the predetermined pump wavelength.

In another aspect of the invention there is provided a system for remote pumping of a Raman fiber amplifier comprising, more than one pump laser as claimed in claim 2 or 4 for producing light at a predetermined pump wavelength located remotely from the Raman fiber amplifier and a laserhead, wherein the length of polarization-maintaining optical fiber connected to each pump laser providing Raman gain for amplifying the light at the predetermined pump wavelength by stimulated Raman scattering is also a delivery fiber to deliver the light at the predetermined pump wavelength to the remotely located Raman fiber amplifier, and means to multiplex the light at the predetermined pump wavelength delivered from each pump laser prior to launching into the Raman fiber amplifier.

BRIEF DESCRIPTION OF THE DRAWINGS

The invention will be better understood by way of the following detailed description of embodiments of the invention with reference to the appended drawings, in which:

FIG. 3 B is schematic representation of an embodiment representing a remote pumping of a Raman fiber amplifier.

FIG. 4 B is schematic representation of an embodiment representing a pumping laser with more than two polarized lasers having progressively higher-order Stokes shifts.

FIG. 4 C is schematic representation of an embodiment representing a pumping laser with two Stokes shifted non polarized lasers.

FIG. 4 D is schematic representation of an embodiment representing a pumping laser with more than two non polarized lasers having progressively higher-order Stokes shifts.

FIG. 4 E is schematic representation of an embodiment representing a pumping laser with more than two polarized lasers with one Stokes shift.

FIG. 4 F is schematic representation of an embodiment representing a pumping laser with more than two polarized lasers, one Stokes shift and more than one delivery fiber.

DETAILED DESCRIPTION

Figure 1:
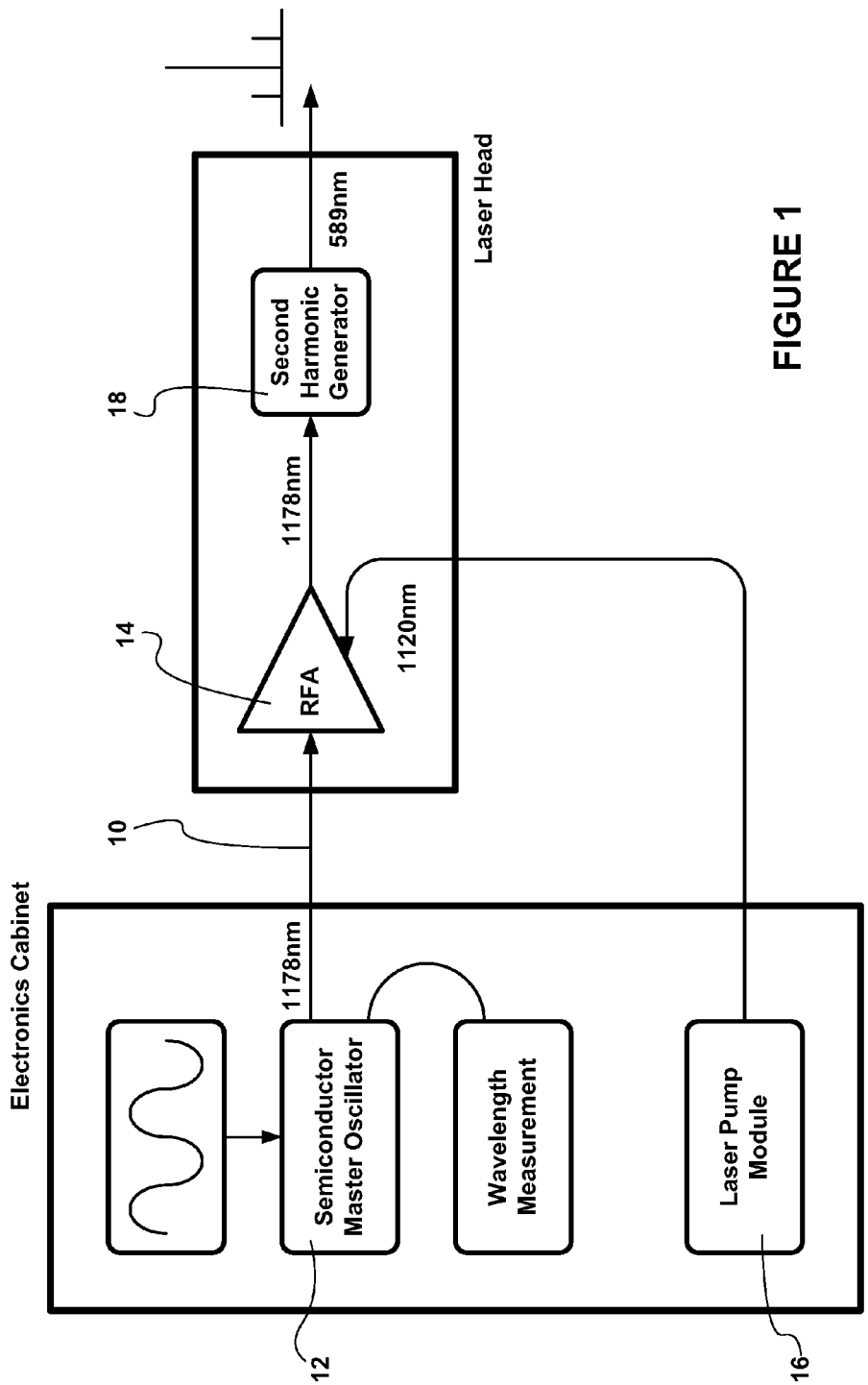
FIG. 1 is a schematic representation of the guide star laser system.

FIG. 1 exemplifies an embodiment of the guide star laser system. A linearly-polarized, narrow-linewidth seed laser light 10 at 1178 nm is generated from a Master Oscillator laser diode (LD) 12. The seed LD can be a low power source (mWatts range), but is controlled to have a stable wavelength. This seed light is amplified through a Raman Fiber Amplifier (RFA) 14. High power pump light, at 1120 nm, from a fiber laser pump 16 is launched into the RFA in a counter-propagating direction with respect to the seed light. The resulting amplified 1178-nm light is then propagated in a Second Harmonic Generator (SHG) 18 to produce the laser guide star beam at 589 nm. Since a linearly-polarized input beam is an essential requirement for frequency doubling in the SHG, the use of polarization-maintaining fiber throughout the pump fiber laser, the pump delivery fiber and the RFA is preferred in order to provide linearly-polarized 1178-nm light directly at the RFA output. Alternatively, additional bulk optical components (e.g. quarter and half wave plates) can be used to tailor the state of polarization of the 1178-nm light prior to launching into the SHG. However, this also requires a feedback loop that continuously monitors the state of polarization and adjusts the wave plates to maintain the correct linear polarization of the 1178-nm light at the input of the SHG.

It is desirable to locate the laserhead on the telescope centerpiece close to the guide star laser launch telescope to avoid a long lossy beam relay optics path. In order to deliver sufficient power to the RFA located in the laserhead, the power at the output of the pump laser is of the order of 100 W or more. The generation of such high optical power is accompanied by the generation of heat which, if it escapes from an enclosure in close proximity to the telescope mirrors, can degrade telescope imaging quality. Therefore, locating the pump and the additional heat producing modules in the electronics cabinet at a distance from the telescope or at least from sensitive optics is desirable. In addition, the electronics cabinet is relatively large and bulky which can make it difficult to mount it in the tight confines close to the launch telescope. However, trying to deliver ~100 W or more of RFA pump power over a long length (e.g. 35-40 m or more) of fiber by launching the output of a traditional "prior art" pump laser would require the use of a large mode area (LMA) fiber (~15 µm mode-field diameter) for the delivery fiber to avoid having a large fraction of the propagating pump power being converted, via stimulated Raman scattering, to useless power at the first Stokes wavelength. However, such LMA fibers usually have smaller index of refraction differences between core and cladding and are therefore very sensitive to bend losses. In addition, they present disadvantages with regards to their ability to maintain single-mode propagation and preserve polarization, particularly in the face of the changing path that the fiber would have to follow in an astronomical telescope installation as the telescope rotates in azimuth and elevation.

Figure 2:
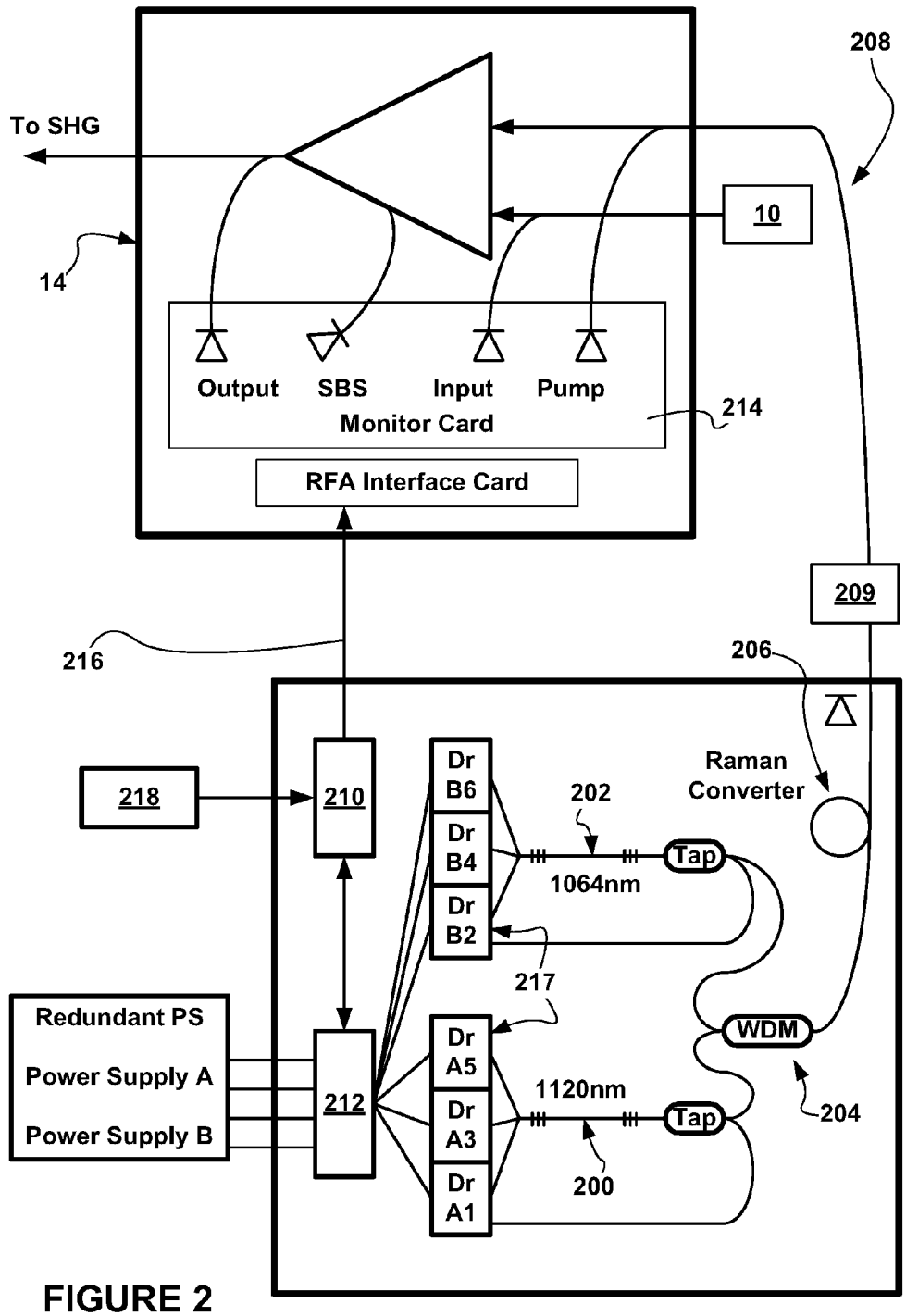
FIG. 2 is a schematic representation of an embodiment of the pump laser of the invention.

Therefore in an aspect of the invention a laser pump is provided that overcomes these limitations. The laser pump design architecture inherently provides the flexibility for "local" pumping or for delivering high-power pump light to the laserhead from a remote location (not immediately adjacent to the laserhead). An embodiment of the laser pump arrangement is depicted in FIG. 2. The light of a first laser 200 emitting at the predetermined pump wavelength, 1120 nm in the present example, is multiplexed with the light of second laser 202 emitting at a lower (Stokes shifted) wavelength, in this case 1064 nm. The multiplexing can be achieved using a wavelength division multiplexing (WDM) device 204, for example. The multiplexed wavelengths are propagated in a length of fiber (Raman converter 206) to produce a Raman gain of the light at the predetermined pump wavelength resulting in an amplified pump beam at 1120 nm. For "local" pumping, the Raman converter is internal to the pump laser module and, since only a relatively short length of fiber is required for the converter (~25 m in this case), regular single-mode fiber with a 6-µm core diameter can be used. For "remote" pumping, the Raman converter fiber becomes the delivery fiber (i.e. the Raman converter is then external to the pump module). If the total fiber length between the pump module output and the laserhead is significantly longer than 25 m (e.g. 35 to 40 m or more), an optical fiber with a lower nonlinearity is used. The pump beam at 1120 nm is amplified as it propagates in the Raman converter fiber 206 and then coupled to the Raman fiber amplifier 14, through a splice box 209 and delivery fiber 208.

In one embodiment a controller 210 that is coupled to the power distributor 212 of the pump lasers and to an RFA monitor card 214 through a digital data link 216 is provided that can adjust the power distribution to laser drivers 217 in response to external command inputs 218 or to inputs from the monitoring of pump and seed laser input powers, Stimulated Brillouin Scattering (SBS) power level and RFA output power from RFA 14.

In addition to the pump delivery flexibility, the two-laser architecture of the pump laser provides a further advantage. Generating the full 100 W or more in a single Yb fiber laser operating at 1120 nm as in the prior art [see for instance J. Wang et al., Optics Express 20(27), 28373-28378 (2012)] increases the amount of multi-mode laser diode pump power that has to be coupled into the inner cladding of the double-clad Yb-doped fiber and poses a greater challenge to ensure adequate cooling of the Yb fiber. In the embodiment depicted in FIG. 2, the generation of the final 100 W of 1120-nm power is shared between two lower power Yb fiber lasers (40 to 70 W) which reduces the amount of laser diode pump power to be coupled into the Yb fiber of each laser and substantially eases the problem of cooling the Yb fiber. Furthermore, a 100-W level Yb fiber laser at 1120 nm would necessarily require the use of Yb fiber with a 10-µm core diameter. This then results in a mode field diameter mismatch where 10-µm core fiber is spliced to standard 6-µm core fiber which leads to increased splice loss and, with 100 W flowing through the splice, a risk of fiber damage at the splice point. The lower operating power of the two lasers of FIG. 2 allows the possibility of using 6-µm core Yb fiber, eliminating splices with a mode field diameter mismatch. However, even if 10-µm core Yb fiber is chosen for these two lasers (to reduce the potential for degradation of the Yb fiber through photo darkening, for example), the power flowing through the mode-mismatched splices and therefore the risk of fiber damage, is substantially less. With the outputs of the two lower-power lasers multiplexed together and launched into the Raman converter fiber, high power (approx. 100 W in this case) at 1120 nm can be obtained at the output of the Raman converter. It will be appreciated that the power of the lasers can be selected according to the pump power needed.

Figure 3A:
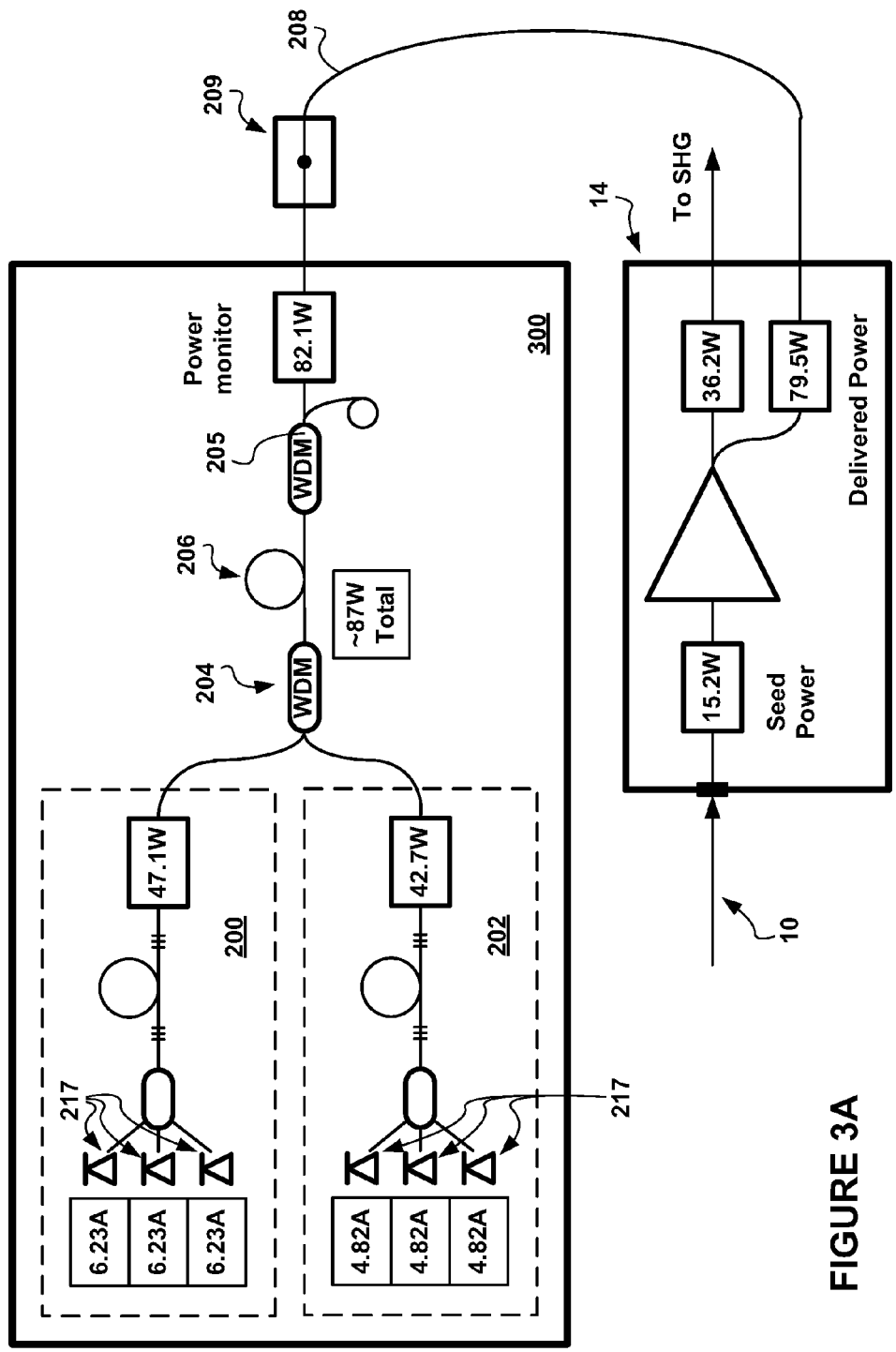
FIG. 3 A is schematic representation of an embodiment representing a "local" pumping of a Raman fiber amplifier.
Figure 3B:
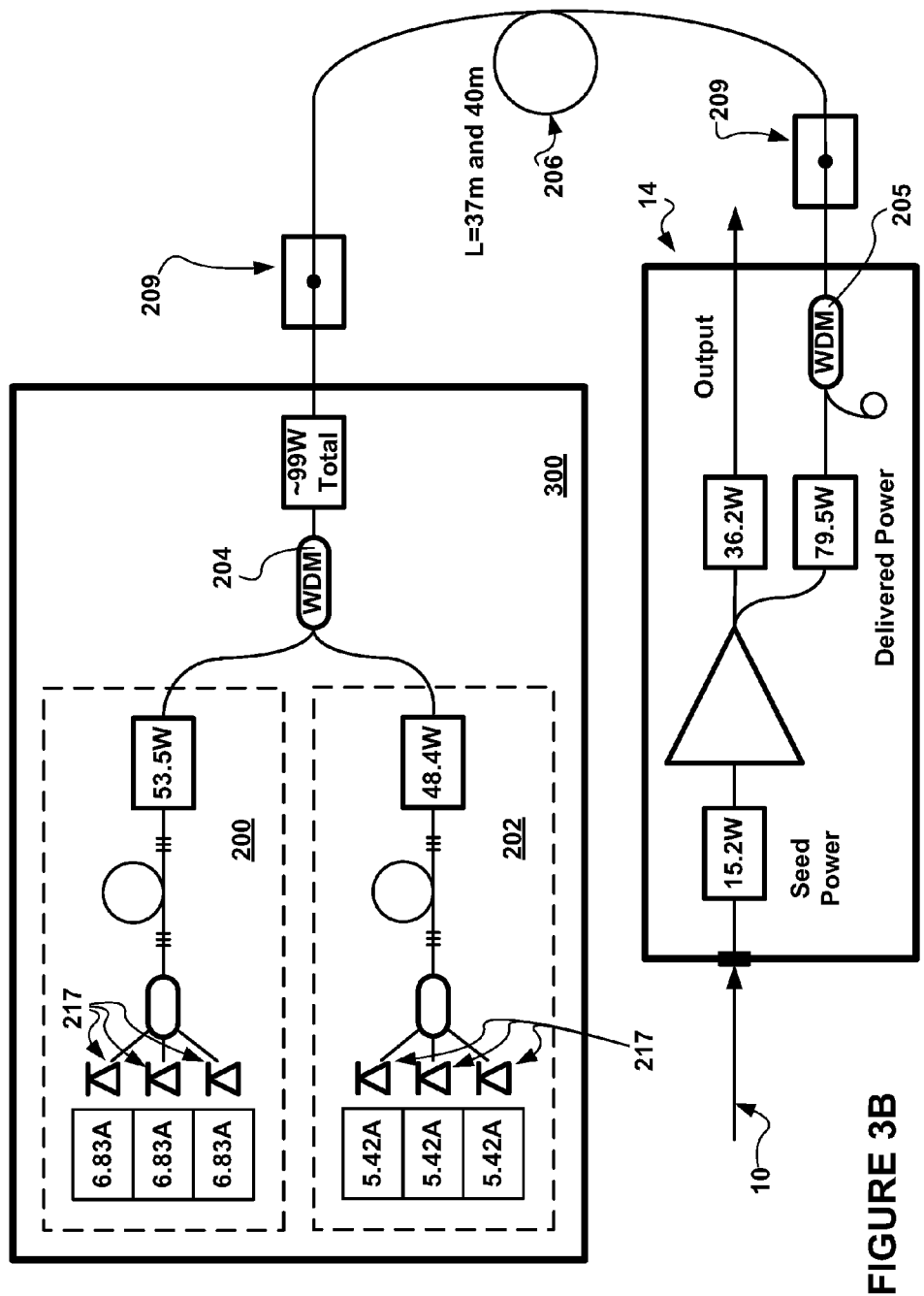

FIGS. 3A and 3B exemplify two embodiments of the RFA based Guide Star Laser of the invention incorporating the laser pump design described above. In embodiment of FIG. 3A, the pump is "local" in the sense that it is relatively close to the laserhead without being immediately adjacent. Fiber Laser Pump Module (FLPM) 300 comprises two lasers (200 and 202) and the Raman converter fiber 206 is located within the FLPM and is coupled to a pump delivery fiber 208 through splice box 209. In embodiment of FIG. 3B, the pump is remotely located. In this embodiment the Raman converter fiber 206 is the delivery fiber and is located outside the FLPM 300. As can be seen, splice boxes 209 can be used for housing the splices that connect the fibers. In the case of the "remote" pumping, more power from laser 200 and 202 may be required to achieve a power at the RFA similar to that for the "local" pumping embodiment and additional WDMs may be required to remove Amplified Spontaneous Emission (ASE) at 1178 nm. In that regard, at the RFA end, the delivered light passes through an 1120/1178-nm WDM 205 where unconverted 1064-nm light and parasitic 1178-nm ASE produced by Raman scattering of the 1120-nm light are filtered out prior to launching the 1120-nm pump light into the RFA.

Figure 4A:
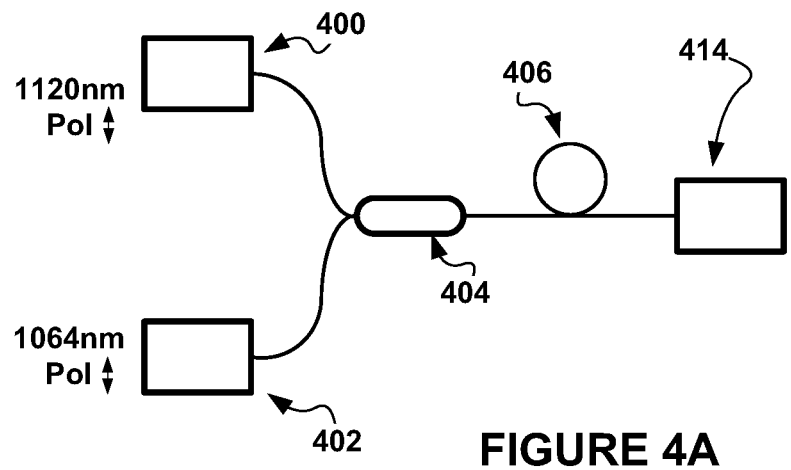
FIG. 4 A is schematic representation of an embodiment representing a pumping laser with two polarized Stokes shifted lasers.
Figure 4B:
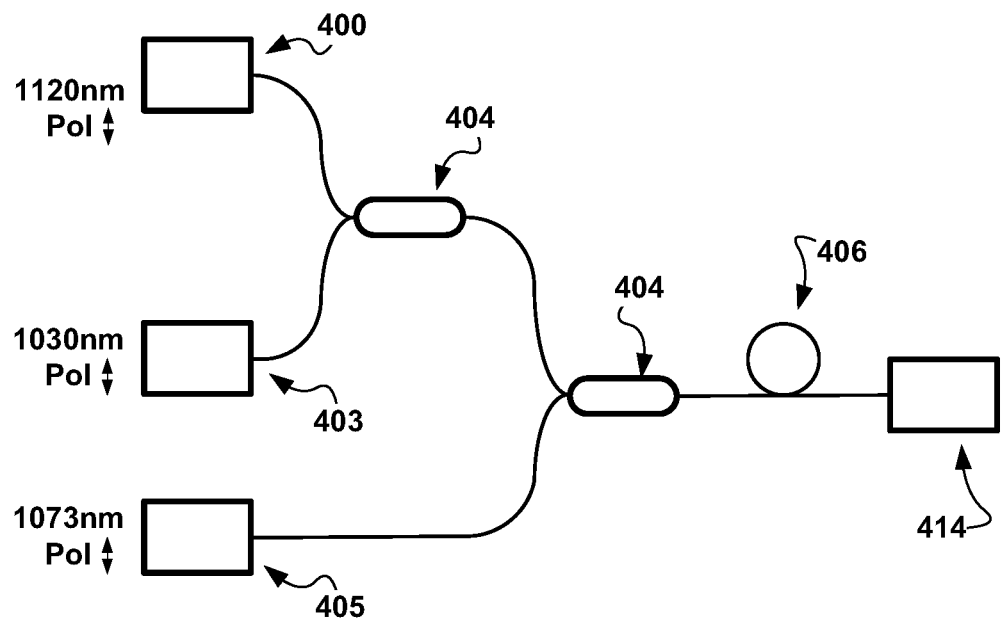
Figure 4C:
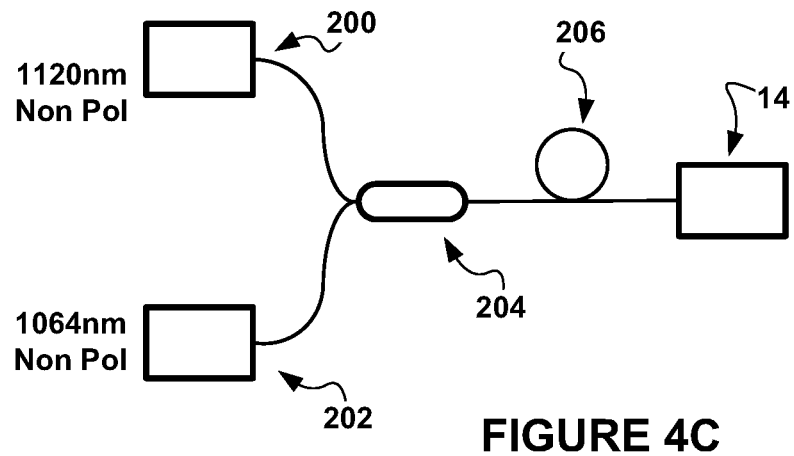
Figure 4D:
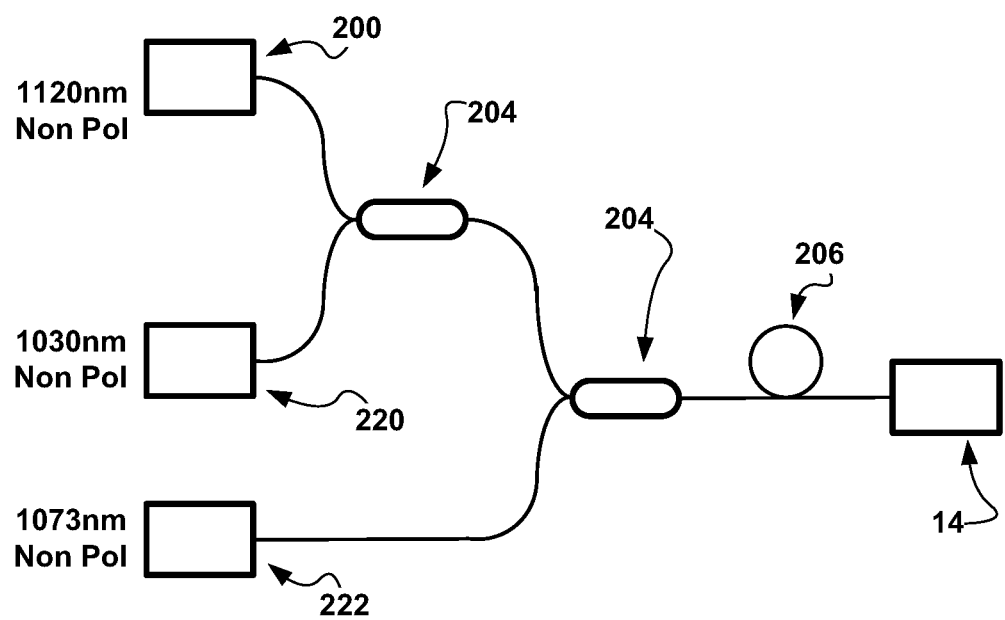

FIGS. 4A and 4C provide schematic representation of laser pumps embodiments in which the Raman converter/delivery fiber is either polarization maintaining (PM) FIG. 4A or not FIG. 4C. The embodiment of FIG. 4A involves two polarized fiber lasers 400 and 402, a PM WDM 404, a PM Raman converter/delivery fiber 406 and a PM Raman fiber amplifier 414 and therefore, the amplified 1178-nm light exiting the RFA will be linearly polarized which is advantageous since it eliminates the need for bulk optical components to tailor the polarization state prior to launching into the SHG which requires a linearly-polarized input. It will be further appreciated that multiple lasers (more than two) with progressively higher-order Stokes shifted emission wavelengths may be used and sequentially multiplexed together prior to launching into the Raman converter/delivery fiber 406 to achieve the desired power as indicated in FIG. 4B (with polarized lasers 400, 403 and 405) and FIG.

Figure 4E:
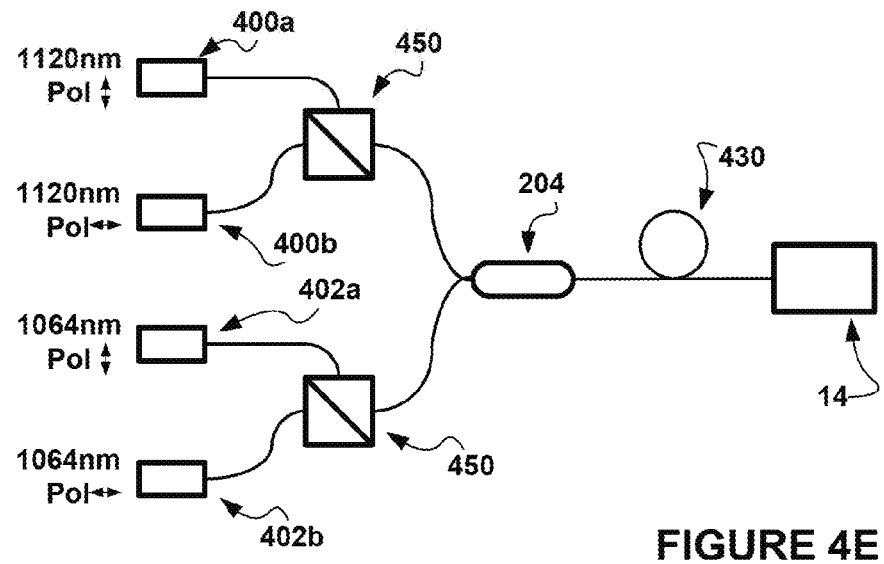
Figure 4F:
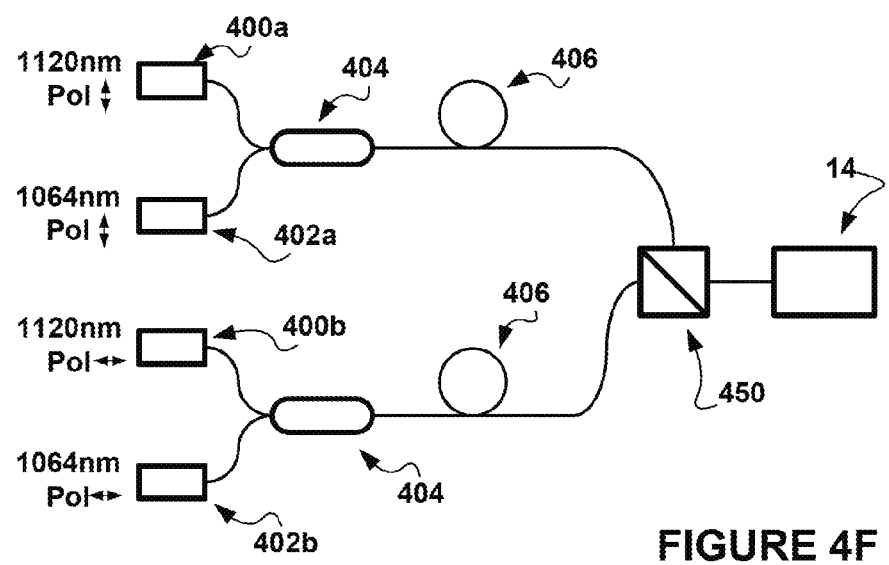

4D (with non-polarized lasers 200, 220 and 222). It will also be appreciated, as shown in FIG. 4E, that two linearly-polarized lasers 400a and 400b at the predetermined pump wavelength can be polarization multiplexed at polarization beam combiner (PBC) 450 and then wavelength multiplexed with the polarization-multiplexed output of two linearly-polarized lasers 402a and 402b emitting at a lower (Stokes shifted) wavelength and launched into the Raman converter fiber. In this case, the Raman converter/delivery fiber 430 could be PM or non-PM since the polarization beam combining of two polarized lasers results in a non-polarized output. The RFA fiber would be non-PM since the delivered 1120-nm pump power would be unpolarized. It will be still further appreciated that, as shown in FIG. 4F, two complete pump lasers as depicted in FIG. 2, each comprising linearly-polarized lasers 400a/402a and 400b/402b, respectively, a PM WDM 404 and a polarization-maintaining Raman converter fiber 406, can be polarization multiplexed at PBC 450 after passage through their respective Raman converter/delivery fibers to provide high power at the RFA predetermined pump wavelength. These types of arrangements may allow high RFA pump powers to be generated with reduced thermal management concerns both for the fibers in the fiber lasers and the laser diodes used to pump them and all these arrangements maintain the flexibility of allowing remote pump delivery. Other multiplexing arrangements employing a plurality of lasers may also be used to achieve the desired RFA pump power.

Figure 5:
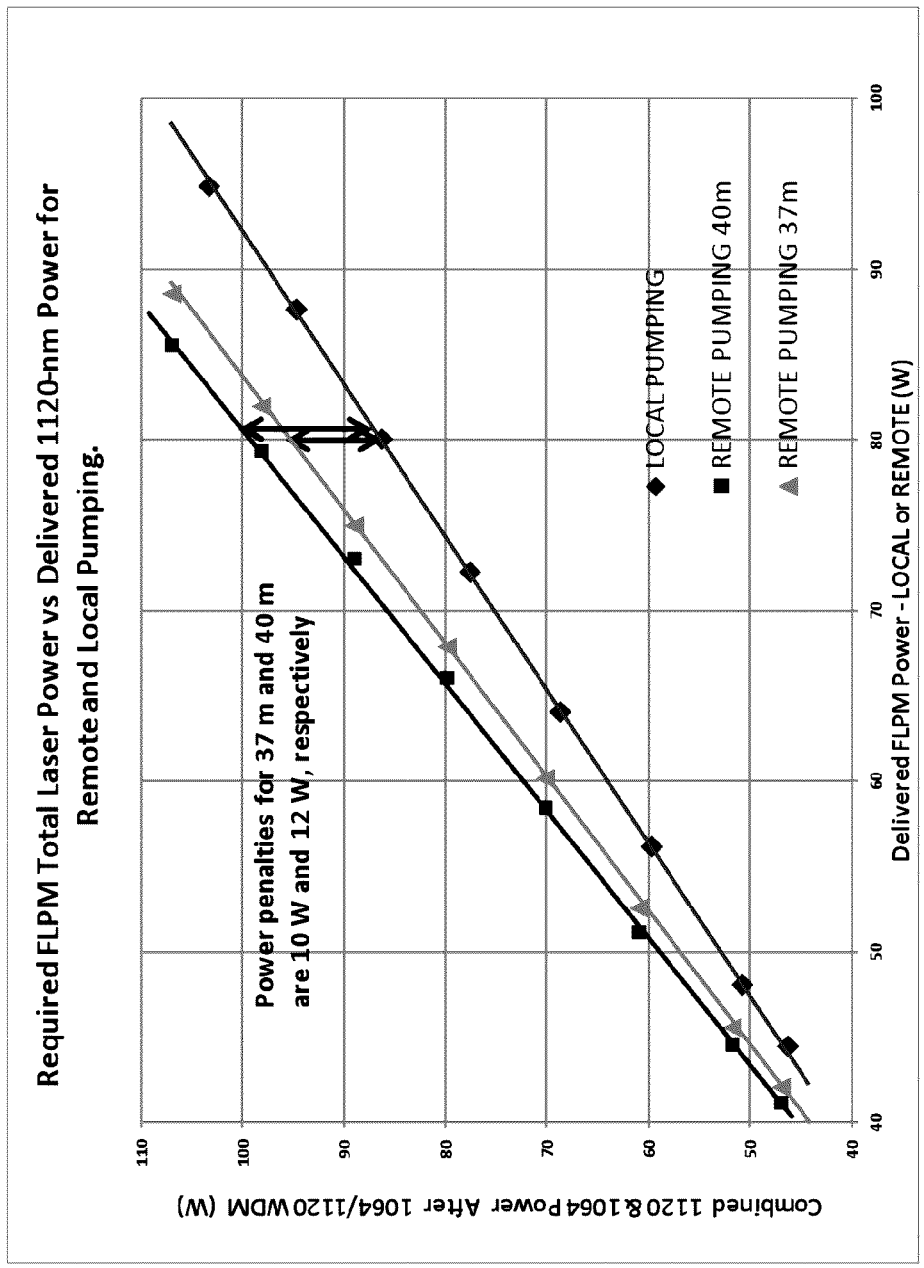
FIG. 5 is a plot of pump source power versus delivered pump power for three different geometries, namely local pumping, 37 m and 40 m.

Approximately 80 W of delivered pump power is required to provide the nominal 36 W of RFA output power. As shown in FIG. 5, the required increases in combined Fiber Laser Pump Module (FLPM) power for two delivery fiber lengths of 37 m and 40 m are 10 and 12 W, respectively and this corresponds to very modest increases in pump diode current of 0.5 and 0.65 A, respectively, in comparison with local pumping.

It will be appreciated that a combination of the dual-wavelength pump architecture plus a moderately larger-core delivery fiber, but one that still robustly provided single-mode propagation, allows the delivery over distances of ~40 m of a sufficient amount of 1120-nm pump light for the RFA to provide its nominal output power of 36 W at 1178 nm. The remote pump delivery scheme will result in an increase of the beginning of life laser diode current by ~0.6 A per laser compared to the case of local pumping. It will be appreciated that the increase in combined FLPM power needed to achieve the desired RFA power in a remote pumping configuration can vary depending of the fiber(s) lengths and power loss due to splice quality and the characteristics of the optical components. It will also be appreciated that using a Raman converter/delivery fiber comprised of a specialty fiber such as one designed to have high losses in the region of the first Stokes shift for 1120-nm light (i.e. in the 1178-nm region) or a solid core photonic crystal fiber that can provide robust single-mode propagation with core diameters in the 15 to 20 μm range could allow higher delivered RFA pump powers and longer delivery distances.

Figure 6:
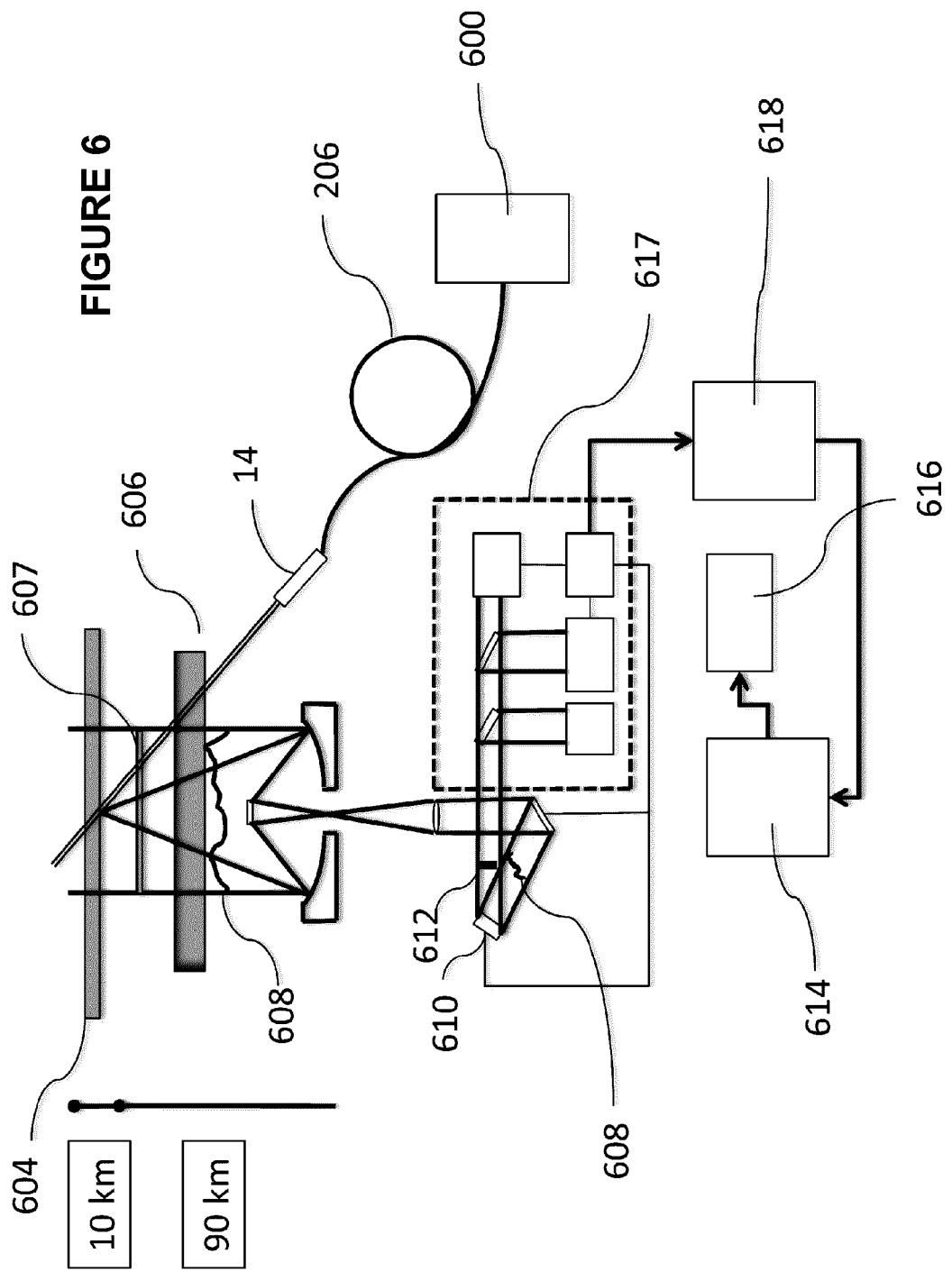
FIG. 6 is a schematic representation of the telescope with probing laser comprising remote pumping of Raman fiber amplifier and the remote access station.

In another aspect of the invention and referring to FIG. 6 there is provided a telescope system comprising a pumping laser, as described above, in the FLPM in the electronics cabinet 600, which also comprises a seed laser, and a Raman fiber amplifier 14 in a laserhead which also comprises a second harmonic generator for generating an excitation laser light capable of producing an artificial "star" in the mesosphere 604 by exciting sodium atoms to fluoresce. The FLPM within electronics cabinet 600 and the Raman fiber amplifier 14 are optically coupled by the Raman converter/delivery fiber 206. Advantageously, the pump laser design of the present invention enables the FLPM electronics to be remotely positioned relative to the optical components of the telescope while still delivering high power pump light at the Raman fiber amplifier 14. The remote location of the FLPM in electronics cabinet 600 virtually eliminates problems associated with local air turbulence and thermal perturbations of the telescope optics that would be caused by the production of heat by high power pump lasers which according to the prior art would be located near the optical components. The information on the distorting impact of atmospheric disturbances on the undistorted wavefront 607 created by turbulent atmospheric layer 606, generated by imaging the artificial "star" is used to adjust the adaptive optics, including deformable mirror 610 to correct the distorted wavefront 608 during acquisition of the imaging data such as to produce a substantially distortion free wavefront 612. The telescope also comprises processor 617 and data storage units 618 to process and store the imaging data. The system can further comprise a remote data processing station 614 to remotely access the imaging data by a user and optionally to remotely provide instructions to make adjustments to subsystems (telescope control 616) within the adaptive optics facility.

What is claimed is:

1. A pump laser system for producing high power laser light of a predetermined pump wavelength comprising:
    a first laser emitting light at the predetermined pump wavelength;
    a second laser emitting light at a wavelength shorter than the predetermined pump wavelength;
    an optical arrangement configured to multiplex light from the first laser and the second laser into an output; and
    a length of regular single-mode optical fiber coupled at a proximal end to said output of said optical arrangement and providing Raman gain at the predetermined pump wavelength to convert the second laser light to light at the predetermined pump wavelength, said length of optical fiber providing Raman gain being a flexible cable for extending to a remotely located optical amplifier, wherein optical powers of the multiplexed first and second laser lights are at respective power levels that result in more power at said predetermined pump wavelength being delivered to a distal end of said length of optical fiber than would be the case if the optical power coupled into said length of optical fiber was entirely at said predetermined pump wavelength.

2. In combination, the pump laser system as claimed in claim 1 and said remotely located optical amplifier comprising a Raman fiber amplifier wherein the length of optical fiber providing Raman gain for amplifying the light at the predetermined pump wavelength by stimulated Raman scattering is a Raman converter, and is also a delivery fiber to deliver the light at the predetermined pump wavelength to the remote optical amplifier.

3. A telescope system comprising:
    the combination as claimed in claim 2 further comprising a seed laser and a second harmonic generator for generating an atmospheric probing laser light to generate information on atmospheric disturbances;
    a telescope comprising adaptive optics to acquire imaging data; and
    processor and data storage units to process and store the imaging data and wherein the information on atmospheric disturbances is used to adjust the adaptive optics to correct for wavefront distortions during acquisition of the imaging data.

4. The telescope system of claim 3 further comprising a remote data station connected to said data storage units to remotely access the imaging data.

5. The telescope system of claim 3, wherein said atmospheric probing laser light comprises light at a wavelength corresponding to excitation of atomic sodium at approximately 589 nm.

6. The pump laser system of claim 1 wherein said first and second lasers are fiber lasers.

7. A pump laser system for producing high power laser light of a predetermined pump wavelength comprising:
   first and second lasers emitting linearly-polarized light at the predetermined pump wavelength;
   a first optical arrangement configured to polarization multiplex the light from the first and second lasers into a first optical fiber;
   third and fourth lasers emitting linearly-polarized light at a wavelength shorter than the predetermined pump wavelength;
   a second optical arrangement configured to polarization multiplex the light from the third and fourth lasers into a second optical fiber;
   a third optical arrangement configured to wavelength multiplex light at the predetermined pump wavelength from the first optical fiber and light from the second optical fiber into an output; and
   a length of single-mode optical fiber coupled at a proximal end to said output of said third optical arrangement providing Raman gain to convert the multiplexed light from the third and fourth lasers to light at the predetermined pump wavelength, said length of optical fiber providing Raman gain being a flexible cable for extending to a remote optical amplifier, wherein optical powers of the multiplexed laser lights at said output of said third optical arrangement are at respective power levels that result in more power at said predetermined pump wavelength being delivered to a distal end of said length of optical fiber than would be the case if the optical power coupled into said length of optical fiber was entirely at said predetermined pump wavelength due to said length of optical fiber causing power at the predetermined pump wavelength being converted to useless power at a first Stokes wavelength via stimulated Raman scattering.

8. A pump laser system for producing high power laser light of a predetermined pump wavelength comprising:
   a first laser emitting light at the predetermined pump wavelength;
   a second laser emitting light at a wavelength shorter than the predetermined pump wavelength;
   an optical arrangement configured to multiplex light from the first laser and the second laser into an output; and
   a length of single-mode optical fiber coupled at a proximal end to an output of said optical arrangement and providing Raman gain at the predetermined pump wavelength to convert the second laser light to light at the predetermined pump wavelength, said length of optical fiber providing Raman gain being a flexible cable for extending to a remotely located optical amplifier, wherein optical powers of the multiplexed first and second laser lights are at respective power levels that result in more power at said predetermined pump wavelength being delivered to a distal end of said length of optical fiber than would be the case if the optical power coupled into said length of optical fiber was entirely at said predetermined pump wavelength due to said length of optical fiber causing power at the predetermined pump wavelength to be converted to useless power at a first Stokes wavelength via stimulated Raman scattering.

9. The pump laser system of claim 8 wherein each of said first and second lasers emits linearly-polarized light having a respective polarization vector, and said optical arrangement combines light from the first and second lasers into a single polarization-maintaining optical fiber so that the respective polarization vectors are mutually parallel and said length of optical fiber providing Raman gain is a length of polarization-maintaining fiber.

10. The pump laser system of claim 8 further comprising a third laser emitting light at a wavelength shorter than the emission wavelength of the second laser; and wherein
   the optical arrangement is configured to multiplex light from the first, the second and the third lasers into an optical fiber; and
   the length of optical fiber provides Raman gain to successively convert the third laser light to light at the second laser wavelength and light at the second laser wavelength to light at the predetermined pump wavelength.

11. The pump laser system of claim 10, wherein each of said first, second and third lasers emits linearly-polarized light having a respective polarization vector, and said optical arrangement combines light from the first, second and third lasers into a single polarization-maintaining optical fiber so that the respective polarization vectors are mutually parallel and said length of optical fiber providing Raman gain is a length of polarization-maintaining fiber.

12. In combination, a pair of pump laser systems as claimed in claim 9 for producing light at the predetermined pump wavelength and said remotely located optical amplifier comprising a Raman fiber amplifier,
   wherein the length of polarization-maintaining optical fiber carrying said multiplexed lights from said first and said second lasers of each of said pair of pump laser systems and providing Raman gain for amplifying the light at the predetermined pump wavelength by stimulated Raman scattering is a Raman converter, and is also a delivery fiber to deliver the light at the predetermined pump wavelength to the location of the remote optical fiber amplifier, and
   a further optical arrangement configured to polarization multiplex the light at the predetermined pump wavelength delivered from each of said pair of pump laser systems prior to launching into the remote optical amplifier.

13. The pump laser system of claim 10 wherein said first and second lasers are fiber lasers.

14. In combination, the pump laser system as claimed in claim 9 and said remotely located optical amplifier comprising a Raman fiber amplifier wherein the length of optical fiber providing Raman gain for amplifying the light at the predetermined pump wavelength by stimulated Raman scattering is a Raman converter, and is also a delivery fiber to deliver the light at the predetermined pump wavelength to the remote optical amplifier.

* * * * *